Nov. 21, 1939.                C. B. FOWLER                2,180,733
              LIQUID CONTAINER WITH ELECTRIC HEATING MEANS
                         Filed March 14, 1939
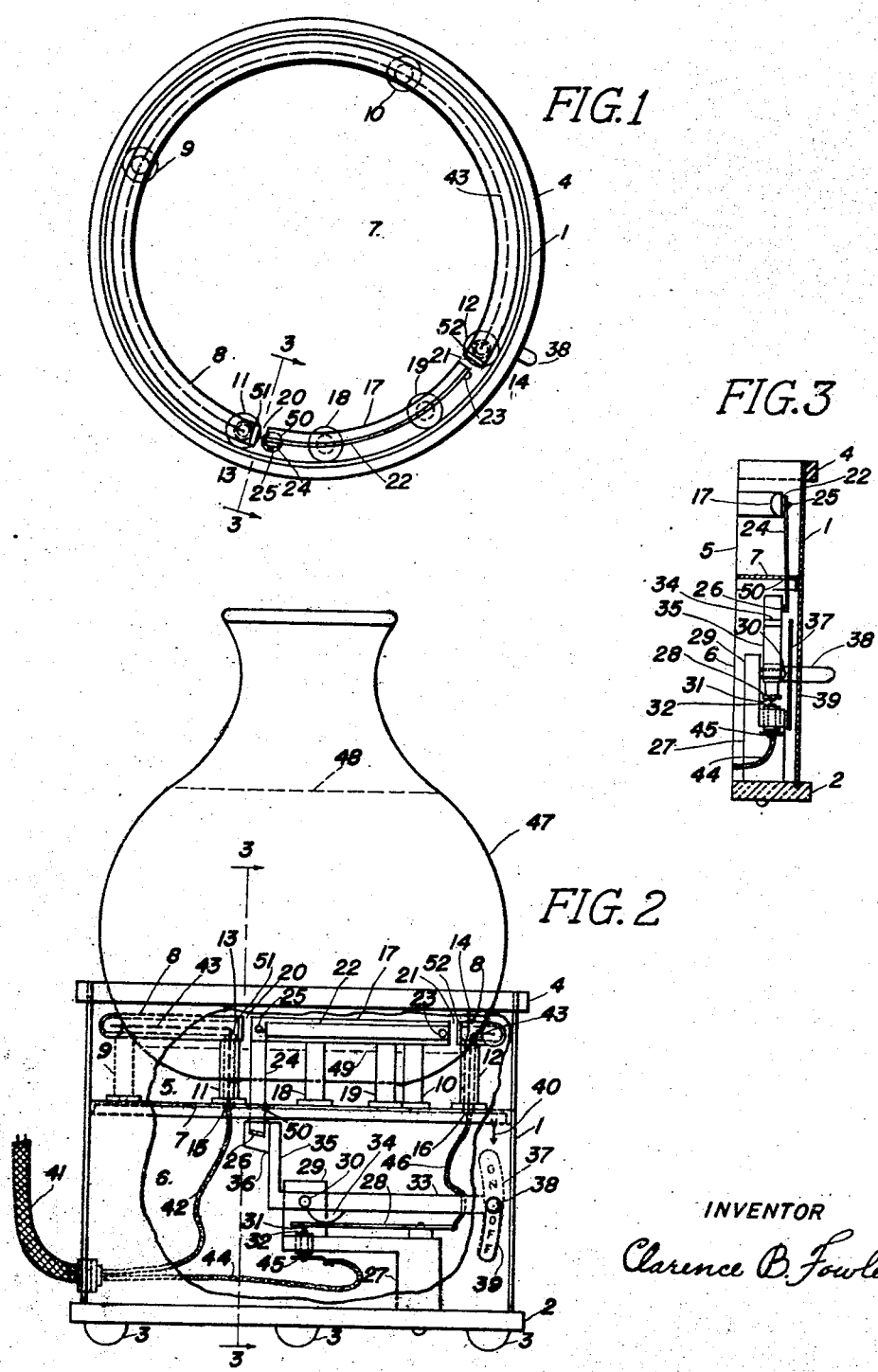
INVENTOR
Clarence B. Fowler Patented Nov. 21, 1939

2,180,733

UNITED STATES PATENT OFFICE 2,180,733

LIQUID CONTAINER WITH ELECTRIC HEATING MEANS

Clarence B. Fowler, West New Brighton, N. Y.

Application March 14, 1939, Serial No. 261,706

10 Claims. (Cl. 219—43)

This invention relates to a means of manually starting and automatically stopping the electrical heating of liquid containers or utensils having the form of a bowl with downwardly tapering lower sides and a bottom without elevations or depressions. The invention is particularly applicable to vacuum type coffee makers but is not limited thereto.

An object of the invention is to provide electric heating means adapted to thermal conduction heating through the sides of a liquid container rather than the bottom.

Another object of the invention is to provide means of manually starting the heating, and automatically disconnecting the source of heat when the level of liquid inside the container has reached a predetermined minimum.

A further object is to provide electrical heating means which will cool rapidly when the electricity is disconnected.

In certain prior types of electrically heated liquid containers, such as percolators and coffee makers, arrangements have been provided for the automatic disconnection of the electricity by the operation of thermostatic devices when the liquid or confined heated air and steam, reached a predetermined maximum temperature. Utensils of this type have required the incorporation of the heating units and thermostatic devices either inside the container, attached to the bottom thereof, or mounted on a lid. The addition of these devices has necessitated the use of metal containers where glass would be preferable, has materially increased the cost of the containers, has resulted in utensils requiring special care in cleaning, and sometimes has caused mechanical instability. In the case of vacuum type coffee makers, accurate functioning or timing has been limited to the use of the utensil at its full capacity.

In this invention these objectionable features have been eliminated. Neither permanent nor temporary mechanical, electrical or thermostatic attachments are made to either the inside or outside of the liquid container, which may be of a wide variety of design. In the functioning of this invention, an electrically heated zone on the exterior side walls of the container maintains substantially the same temperature as that of the liquid within the container while the liquid is in contact with the inside surface of the heated zone. When, however, the level of liquid in the container falls below that of the heated zone, the temperature of the latter increases, due to the relatively inferior thermal conductivity of the steam or air in contact with the heated zone, and causes the operation of a thermostatic cut-off device associated with the electrical heating means.

I attain the objects of this invention by means illustrated in the accompanying drawing, in which—

Fig. 1 is a plan view of the upper open compartment of the stove; Fig. 2 a vertical elevation of the stove with the lower bowl of a vacuum type coffee maker in heating position thereon; and Fig. 3, a vertical section of a part of the stove along the line 3—3.

Similar numerals refer to similar parts throughout the several views.

The sides of the stove are enclosed by an outer shell 1, shown partially cut away in Fig. 1. The upper edge of shell 1 is surrounded by a ring 4, and the lower edge is mounted upon a base plate 2. The stove is supported by feet 3, attached to the under side of base plate 2. The internal space enclosed by shell 1 is divided into an upper open compartment 5, and a lower closed compartment 6, by shelf 7, which is parallel to base plate 2.

A hollow arc member 8, preferably of nickel silver tubing, is mounted in upper compartment 5, in a plane parallel to shelf 7, and supported thereon by solid posts 9 and 10 and hollow posts 11 and 12. The ends of arc member 8 are closed by plugs 51 and 52, preferably of metal of relatively high heat conductivity. The open upper ends of posts 11 and 12 are positioned under apertures 13 and 14, respectively, in arc member 8. The openings in the lower ends of posts 11 and 12 are positioned over apertures 15 and 16, respectively, in shelf 7.

Also mounted in upper compartment 5, in the same plane and having the same center and radius as arc member 8, is a solid arc member 17, positioned in the space between the ends of arc member 8 but separated therefrom by air gaps 20 and 21. Arc member 17 is of hemispherical cross section of the same diameter as arc member 8, with the flat side facing shell 1 and at right angles to shelf 7. Arc member 17 is preferably of metal of relatively high thermal conductivity, such as copper or aluminum, and is supported on shelf 7 by solid mounting posts 18 and 19.

Posts 9, 10, 11, 12, 18 and 19 are preferably of a vitreous material of relatively low thermal conductivity.

One end of a strip 22, of thermostatic bi-metal of the same curvature as that of the flat side of arc member 17, is attached thereto by rivet 23. A downwardly projecting strip 24, of metal having a spring temper is affixed to the free end of strip 22 by rivet 25. Strip 24 projects into compartment 6 through aperture 50 in shelf 7. The lower end of strip 24 is formed into a hook 26.

A stand 27, secured to base plate 2 in compartment 6, supports contact spring 28 and contact 32. Directly above contact 32 and normally separated therefrom by an air gap, is located contact 31 on contact spring 28. Stand 27 also has an upwardly extending arm 29 to which is rigidly affixed fulcrum pivot 30.

A bell crank lever 33, to which is secured a cam 34, is rotatively mounted on pivot 30. Contact spring 28 is tensioned against cam 34. The long arm of lever 33 terminates in a knob 38 which projects outside of shell 1 through slot 39. The tension exerted by spring 28 against cam 34 normally maintains knob 38 in contact with the upper edge of slot 39. The short arm 35 of the lever terminates in a member having a lower edge 36 adapted to engage with hook 26.

An indicator plate 37, showing the words "On" and "Off" on the outer face thereof, is secured to knob 38 under slot 39, the word "Off" being normally visible through the slot when viewed from the exterior of the stove. An arrow 40 on the exterior surface of shell 1 indicates the direction of manual operation of knob 38.

Electricity is supplied to the stove through lead 41. In compartment 6, asbestos insulated conductor 42 is connected through post 11 to one end of a suitable resistance wire 43 in tubular arc member 8, preferably insulated with magnesium oxide. Asbestos insulated conductor 44 is connected to contact terminal clip 45. One end of asbestos insulated conductor 46 is connected through post 12 to resistance wire 43 and the other end to contact spring 28.

A lower bowl 47, of a glass vacuum type coffee maker is shown in heating position upon arc members 8 and 17, in Fig. 2. An upper water level is indicated by line 48 and a lower water level by line 49. It will be understood by those versed in the art that this bowl may be used in combination with an open upper bowl not shown in the drawing, having a tubular extension open at both ends extending from its bottom into the lower bowl and terminating therein above the bottom of the latter.

In the operation of this improvement lead 41 is connected to a suitable source of electricity and a bowl, such as 47, with liquid contents to the level indicated by line 48, is seated upon arc members 8 and 17. Knob 38 is then moved downward in slot 39, causing the word "On" to be displayed in place of the word "Off" and also causing cam 34 to depress contact spring 28 and close contacts 31 and 32. Short arm 35 of lever 33 is at the same time moved upwards against the sliding friction of hook 26 until the latter slips under edge 36, latching the lever in the operating position. An electrical circuit having been closed through leads 44 and 46, resistance wire 43 and lead 42, the heating of the contents of bowl 47 begins by the combined conduction of heat from arc member 8 through the walls of the bowl and reflection of heat from the interior surface of shell 1 and the upper surface of shelf 7. Due to the absorption of this heat by the liquid, the temperature of arc member 17 does not rise at this period in the operating cycle beyond that of the interior of the bowl, and the thermostatic member 22 does not bend away from arc member 17 sufficiently to release hook 26. When, however, part of the liquid has either steamed away, or been displaced by steam and air pressure in the bowl to an upper chamber as in the case of vacuum type coffee makers, to level 49, the surface of container 47 adjacent to arc member 8 rises in temperature, due to the steam and air in the bowl not being as effective in absorbing the heat as was the liquid. This rise in temperature is conducted by the surface of the container 47 at air gaps 51 and 52 to arc member 17, causing its temperature to rapidly rise throughout its length. Thermostatic member 22 is then further flexed away from arc member 17, causing hook 26 on spring 24 to disengage from edge 36 of lever 33 and reassume its normal position with contacts 31 and 32 open and the word "Off" displayed in slot 39.

It will be understood by those versed in the art, that the opening of the electrical circuit and the consequent stoppage of the heating will, in the case of vacuum type coffee makers, result in the automatic completion of the coffee brewing cycle. In the case of other types of liquid containers, damage to the container or its contents from boiling away of the liquid, is prevented.

In the functioning of this invention the thermostatic cut-off feature has been found to operate satisfactorily with a relatively moderate increase in temperature above that of the liquid in the container, thus preventing damage to the container. In the case of vacuum type coffee makers, sufficient time will elapse, however, to permit some steam to escape into the upper bowl and agitate the coffee grounds therein, thus extracting a fuller flavor and requiring the use of less coffee than in the case of devices of similar type not permitting the escape of steam.

While I have shown a particular embodiment of my invention, I do not wish to be limited thereto, as many modifications can be made. For example, the thermostatic member and its associated mechanism may be designed in a variety of forms; the upper compartment of the stove may be provided with stops preventing excessive tilting of the bowl; or an auxiliary heating unit in circuit with that shown, may be provided.

I claim:

1. A liquid container with heating means, comprising a stove and a bowl having a bottom without functional elevations or depressions removably mounted thereon by stove members contacting with the exterior surface of the bowl at points above a predetermined minimum liquid level therein, one of said stove members also constituting means for transmitting heat to the bowl and the other of said stove members also constituting means for receiving heat from the bowl.

2. A liquid container with electrical heating means, comprising an electric stove and a bowl having a bottom without functional elevations or depressions removably mounted thereon by two stove members contacting with the exterior surface of said bowl at points above a predetermined minimum liquid level therein, one of said stove members also constituting means for transmitting heat generated by the stove to the bowl, and the other of said stove members also constituting means for receiving heat from the bowl.

3. A liquid container with electrical heating means, comprising an electric stove and a bowl having a bottom without functional elevations or depressions removably mounted thereon by two stove members contacting with the exterior surface of said bowl at points above a predetermined minimum liquid level therein, one of said stove members also constituting means for transmitting heat generated by the stove to the bowl, and the other of said stove members also constituting means for receiving heat from the bowl; and heat actuated means associated with said heat receiving means for automatically discontinuing the generation of heat by the stove.

4. A liquid container with electrical heating means, comprising an electric stove, manually operable latching means for starting the generation of heat thereby; a bowl having a bottom without functional elevations or depressions removably mounted on the stove by two stove members contacting with the exterior surface of the bowl at points above a predetermined minimum liquid level therein, one of said stove members also constituting means for conducting heat generated by the stove to the bowl, and the other of said stove members also constituting means for receiving heat from the bowl; and heat actuated means associated with said heat receiving means for automatically discontinuing the generation of heat by the stove.

5. An electric stove comprising a base, a casing and a top, a plurality of substantially vertical posts mounted upon the top, two diametrically disposed supports forming a bowl seat mounted upon said posts, electrical heating means within one of said supports, a thermostatic member mounted upon the other of said supports, manually operable latching means for connecting electricity to said heating means, and means controllable by said thermostatic member for automatically disconnecting the electricity.

6. In combination with a vacuum type coffee maker having upper infusion and lower water bowls and an open tubular connection therebetween having a lower end terminating above the interior bottom of said lower bowl, an electric stove comprising a base, a casing and a top, a plurality of substantially vertical posts mounted upon the top, two diametrically disposed supports forming a bowl seat mounted upon said posts, electrical heating means within one of said supports, a heat actuated mechanism mounted upon the other of said supports, manually operable latching means for connecting electricity to said heating means, and means controllable by said heat actuated mechanism for automatically disconnecting the electricity.

7. A liquid container with electrical heating means, comprising a circular bowl unit with downwardly tapering sides and a bottom without functional elevations or depressions, an electric stove having a base, a casing, an enclosed lower compartment, an open upper compartment, a plurality of substantially vertical posts mounted in said top compartment, two mutually separated diametrically disposed circular arc members mounted in a horizontal plane upon said posts and forming a contacting seat for said bowl in a zone above a predetermined minimum liquid level therein, electrically insulated but thermally conducting electrical heating means within one of said arc members, manually operable latching means in said lower compartment for connecting electricity to said heating means, a thermostatic member mounted upon the other of said arc members, and means in the lower compartment controlled by the thermostatic member to disconnect the electricity when the temperature of the thermostatic member has reached a predetermined maximum.

8. A liquid container with electrical heating means, comprising an electric stove and a hollow utensil having a bottom without functional elevations or depressions removably mounted thereon, and two stove members contacting with the exterior side surface of said utensil at points above a predetermined minimum level of liquid therein, one of said stove members comprising means for conducting heat to the utensil, and the other of said stove members comprising means for conducting heat from the utensil.

9. A liquid container with electrical heating means, comprising an electric stove and a hollow utensil having a bottom without functional elevations or depressions removably mounted thereon; and two stove members contacting with the exterior side surface of said utensil at points above a predetermined minimum level of liquid therein, one of said stove members comprising means for conducting heat to the utensil, and the other of said stove members comprising means for conducting heat from the utensil; and heat actuated means associated with said heat receiving member for automatically disconnecting the electrical heating means.

10. A liquid container with electrical heating means, comprising an electric stove, manually operable latching means for starting the generation of heat thereby, a hollow utensil having a bottom without functional elevations or depressions removably mounted thereon, two stove members contacting with the exterior side surface of said utensil at points above a predetermined minimum liquid level therein, one of said stove members comprising means for conducting heat to the utensil, and the other of said stove members comprising means for conducting heat from the utensil to a thermostatically controlled mechanism for automatically disconnecting the heating means when the temperature of said heat receiving member has reached a predetermined maximum.

CLARENCE B. FOWLER.